US012574732B2

(12) United States Patent
Kim et al.

(10) Patent No.: US 12,574,732 B2
(45) Date of Patent: Mar. 10, 2026

(54) PROVIDING LOCATION-BASED TELECOMMUNICATIONS RESOURCES TO USERS SYSTEMS AND METHODS

(71) Applicant: T-Mobile USA, Inc., Bellevue, WA (US)

(72) Inventors: Joohyung Kim, Seattle, WA (US); Chen An Wang, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 313 days.

(21) Appl. No.: 18/475,105

(22) Filed: Sep. 26, 2023

(65) Prior Publication Data

US 2025/0106631 A1      Mar. 27, 2025

(51) Int. Cl.
| | |
|---|---|
| *H04W 60/00* | (2009.01) |
| *G06F 21/64* | (2013.01) |
| *H04W 8/18* | (2009.01) |
| *H04W 12/08* | (2021.01) |
| *H04W 12/63* | (2021.01) |

(52) U.S. Cl.
CPC ............ *H04W 12/08* (2013.01); *G06F 21/64* (2013.01); *H04W 8/18* (2013.01); *H04W 12/63* (2021.01); *H04W 60/00* (2013.01)

(58) Field of Classification Search
CPC ....... H04W 12/08; H04W 12/63; H04W 8/18; H04W 60/00; G06F 21/64
USPC .......................................................... 455/411
See application file for complete search history.

(56) References Cited

U.S. PATENT DOCUMENTS

| | | | |
|---|---|---|---|
| 5,588,042 | A | 12/1996 | Comer |
| 5,953,652 | A | 9/1999 | Amin et al. |
| 6,052,591 | A | 4/2000 | Bhatia |
| 6,198,935 | B1 | 3/2001 | Saha et al. |
| 6,829,593 | B1 | 12/2004 | Ritter et al. |
| 6,865,260 | B1 | 3/2005 | Meadows et al. |
| 7,127,261 | B2 | 10/2006 | Van |
| 7,203,502 | B2 | 4/2007 | Wilson et al. |

(Continued)

FOREIGN PATENT DOCUMENTS

| | | |
|---|---|---|
| CN | 103888901 B | 5/2018 |
| CN | 108476398 A | 8/2018 |

(Continued)

*Primary Examiner* — Mark G. Pannell
(74) *Attorney, Agent, or Firm* — Perkins Coie LLP

(57) ABSTRACT

Systems and methods for providing location-based telecommunications resources to users are disclosed. The system detects a presence of a mobile device of a user being in a geographical area serviced by a telecommunications service provider. The system determines that the mobile device is not registered with the telecommunications service provider. The system provides a message to the mobile device indicating availability of a temporal-based access to one or more telecommunications resources. In response to receiving a response from the mobile device, the system activates the temporal-based access to the one or more telecommunications resources for a first time period. The system determines whether the user is associated with a geographically-related status, where the geographically-related status indicates that the user is located within the geographical area for a second time period. The system updates the first time period to a third time period using the second time period.

20 Claims, 6 Drawing Sheets

(56) References Cited

U.S. PATENT DOCUMENTS

| | | | |
|---|---|---|---|
| 7,321,778 | B2 | 1/2008 | Ignatius et al. |
| 7,336,950 | B2 | 2/2008 | Pettine |
| 7,444,137 | B1 | 10/2008 | Mcnamara et al. |
| 7,532,899 | B2 | 5/2009 | Wilson et al. |
| 7,693,752 | B2 | 4/2010 | Jaramillo |
| 7,770,137 | B2 | 8/2010 | Forbes et al. |
| 7,941,171 | B2 | 5/2011 | Vempati et al. |
| 7,974,645 | B2 | 7/2011 | Choi-grogan |
| 7,991,432 | B2 | 8/2011 | Silverbrook et al. |
| 8,204,479 | B2 | 6/2012 | Vendrow et al. |
| 8,208,940 | B2 | 6/2012 | Noldus et al. |
| 8,320,344 | B2 | 11/2012 | Hodroj et al. |
| 8,676,187 | B2 | 3/2014 | Ionescu et al. |
| 8,683,609 | B2 | 3/2014 | Bravo et al. |
| 8,792,867 | B1 | 7/2014 | Negahban et al. |
| 8,805,365 | B2 | 8/2014 | Heckman et al. |
| 9,021,598 | B1 | 4/2015 | Myers et al. |
| 9,083,680 | B2 | 7/2015 | Marsico |
| 9,084,071 | B2 | 7/2015 | Lisboa |
| 9,357,073 | B2 | 5/2016 | Tuchman et al. |
| 9,537,661 | B2 | 1/2017 | Khalil et al. |
| 9,565,175 | B1 | 2/2017 | Saylor et al. |
| 9,600,481 | B2 | 3/2017 | Jacoby |
| 9,824,371 | B2 | 11/2017 | Kramer et al. |
| 10,097,546 | B2 | 10/2018 | Hao et al. |
| 10,192,242 | B1 | 1/2019 | Duque De Souza |
| 10,708,713 | B2 | 7/2020 | Dewan |
| 10,715,996 | B1 | 7/2020 | Singh et al. |
| 10,778,849 | B2 | 9/2020 | Dempster et al. |
| 10,831,778 | B2 | 11/2020 | Gokhale et al. |
| 10,939,268 | B1 | 3/2021 | Roy et al. |
| 10,999,734 | B1 | 5/2021 | Alexander et al. |
| 11,080,411 | B2 | 8/2021 | Kurian et al. |
| 11,081,214 | B1 | 8/2021 | Whitaker et al. |
| 11,093,899 | B2 | 8/2021 | Punzalan et al. |
| 11,151,315 | B1 | 10/2021 | Reyes et al. |
| 11,157,601 | B2 | 10/2021 | Miu |
| 11,191,253 | B2 | 12/2021 | Heeger et al. |
| 11,461,759 | B1 | 10/2022 | Gailloux et al. |
| 11,463,450 | B2 | 10/2022 | Talwar et al. |
| 11,574,299 | B2 | 2/2023 | Burrell et al. |
| 11,682,042 | B2 | 6/2023 | Lin |
| 2004/0192339 | A1 | 9/2004 | Wilson et al. |
| 2005/0136988 | A1 | 6/2005 | Villamil et al. |
| 2005/0143097 | A1 | 6/2005 | Wilson et al. |
| 2007/0010245 | A1* | 1/2007 | Levitan ................. G06Q 50/60 |
| | | | 455/411 |
| 2008/0139165 | A1 | 6/2008 | Gage et al. |
| 2009/0132813 | A1 | 5/2009 | Schibuk |
| 2009/0217364 | A1* | 8/2009 | Salmela .............. H04W 12/068 |
| | | | 726/6 |
| 2009/0298470 | A1* | 12/2009 | Huber ................... H04W 76/10 |
| | | | 455/411 |
| 2010/0008259 | A1* | 1/2010 | Yoon ..................... H04W 48/20 |
| | | | 370/254 |
| 2010/0041365 | A1* | 2/2010 | Lott ...................... H04W 60/00 |
| | | | 455/406 |
| 2010/0159871 | A1 | 6/2010 | Tester |
| 2010/0192212 | A1* | 7/2010 | Raleigh .............. G06Q 30/0207 |
| | | | 726/7 |
| 2010/0273462 | A1* | 10/2010 | Thorn .................... H04W 8/26 |
| | | | 455/414.1 |
| 2011/0265158 | A1* | 10/2011 | Cha ......................... H04W 4/70 |
| | | | 726/6 |
| 2012/0284591 | A1 | 11/2012 | Seed et al. |
| 2013/0018705 | A1 | 1/2013 | Heath et al. |
| 2013/0132854 | A1* | 5/2013 | Raleigh ................. G06F 3/0482 |
| | | | 715/738 |
| 2014/0055812 | A1 | 2/2014 | Deroller |
| 2014/0324589 | A1 | 10/2014 | Pacey |
| 2016/0247245 | A1 | 8/2016 | Baic |
| 2017/0214684 | A1 | 7/2017 | Gupta |
| 2017/0293950 | A1 | 10/2017 | Rathod |
| 2018/0060989 | A1 | 3/2018 | Hietanen et al. |
| 2020/0118140 | A1 | 4/2020 | Phillips et al. |
| 2020/0314628 | A1* | 10/2020 | Panchal ............. H04L 41/5022 |

FOREIGN PATENT DOCUMENTS

| | | |
|---|---|---|
| CN | 107071725 B | 12/2020 |
| CN | 112438056 A | 3/2021 |
| DE | 10154546 B4 | 6/2005 |
| EP | 1465446 B1 | 8/2005 |
| EP | 1518435 B1 | 2/2012 |
| KR | 101014477 B1 | 2/2011 |
| WO | 0110090 A1 | 2/2001 |
| WO | 0174097 A1 | 10/2001 |
| WO | 2012172160 A1 | 12/2012 |
| WO | 2020128455 A2 | 6/2020 |
| WO | 2021021374 A1 | 2/2021 |

* cited by examiner

400

500

Network
506

Server
508b

Servers
508a

Network Access Node
504a

Network Access Node
504b

Satellite
504c

Computing Device
502

600

PROVIDING LOCATION-BASED TELECOMMUNICATIONS RESOURCES TO USERS SYSTEMS AND METHODS

BACKGROUND

A wireless network, such as a cellular network, can include an access node (e.g., base station) servicing multiple wireless devices or user equipment (UE) in a geographical area covered by a radio frequency transmission provided by the access node. As technology has evolved, different carriers within the cellular network have utilized different types of radio access technologies (RATs). RATs can include, for example, 3G RATs (e.g., GSM, CDMA, etc.), 4G RATs (e.g., WiMax, Long Term Evolution (LTE, etc.), or 5G RATs (New Radio (NR)). To connect to a cellular network, wireless devices may use a Subscriber Identify Module (SIM) card that stores a variety of information, which is used to identify and authenticate subscribers on wireless devices.

SIM cards are physical cards and can be universal integrated circuit cards (UICC). SIM cards may include a unique serial number (integrated circuit card identifier (ICCID)), international mobile subscriber identity (IMSI) number, security authentication and ciphering information, temporary information related to the local network, a list of the services a user has access to, and four passwords: a personal identification number (PIN) for ordinary use, and a personal unblocking key (PUK) for PIN unlocking as well as a second pair (called PIN2 and PUK2 respectively), which are used for managing fixed dialing numbers and some other functionality. While SIM cards can provide access to a given carriers' cellular network, users must have a subscription to the given carriers' cellular network and be in possession of a SIM card to enable such access. When a user travels to a location not serviced by a carrier to which they have a subscription or when a user does not have a SIM card enabled to access such carrier, the user cannot access the cellular network.

BRIEF DESCRIPTION OF THE DRAWINGS

Detailed descriptions of implementations of the present invention will be described and explained through the use of the accompanying drawings.

Figure 1:
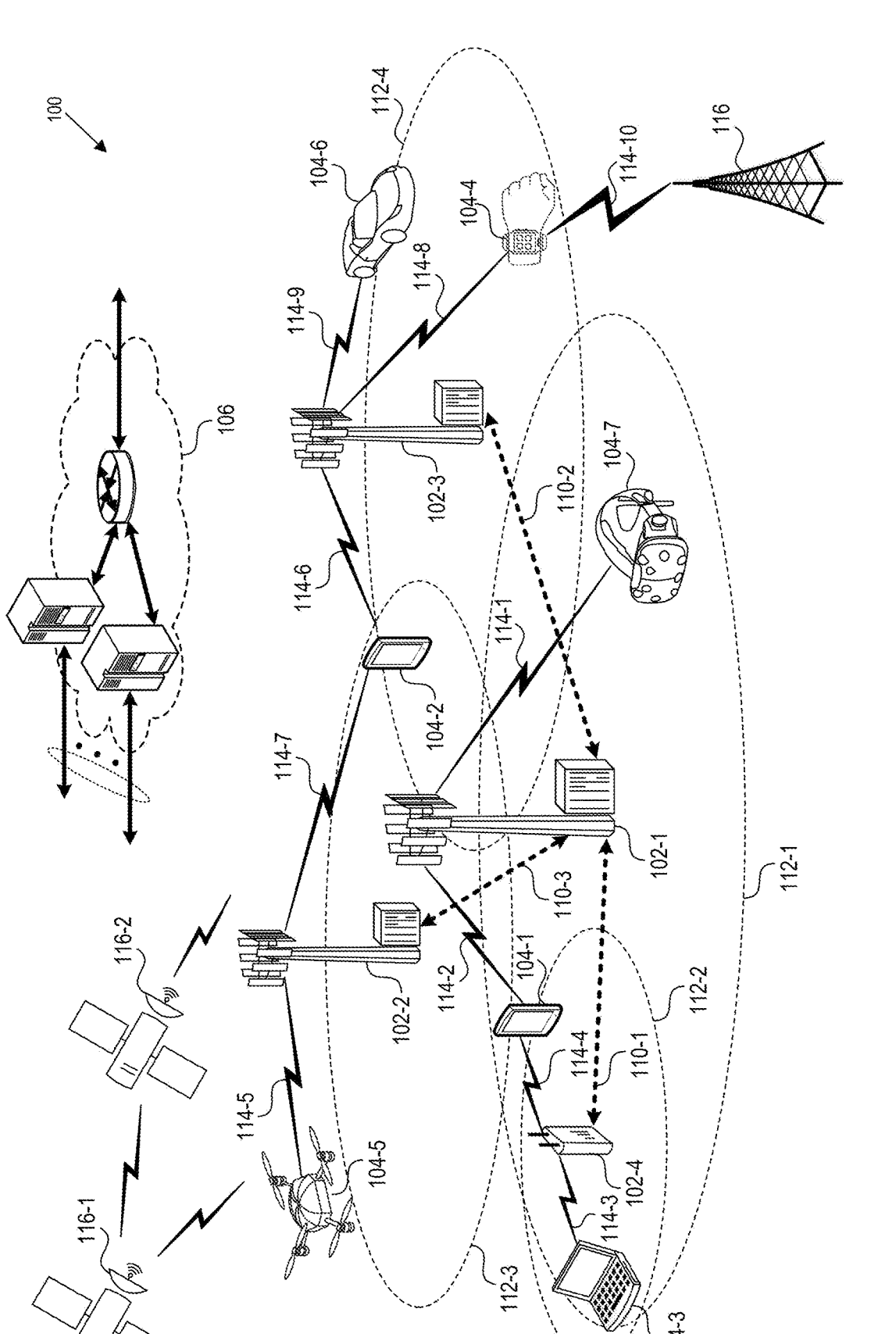
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Being connected to cellular networks enables people to connect not only to their friends and family but also to various societal, economical, and educational resources. For example, the impact that an Internet connection may have on people in modern-day society is unparalleled. Between users having the ability to quickly and securely check a bank account, arrange transportation, or locate a restaurant, being connected to the Internet provides users with an advantage over others without such a connection.

However, travelers can face many hurdles getting connected to a telecommunications network, let alone the Internet. For example, when a person travels to a different geographic region, a cellular connection available via their home cellular service provider may not be available. Although the person may have a cellular carrier or other telecommunications carrier in a home region (e.g., home carrier), upon traveling to a different geographic region, the cellular carrier may not service the geographic region the person is currently located in. This leads to the person needing to acquire wireless network service from a telecommunications carrier that services that geographic region to perform normal day-to-day activities.

While existing systems may use partnering telecommunications/cellular carriers to provide service to users who travel from one geographic region to another, not all telecommunications/cellular carriers have a partnership agreement with each other. In such instances, users are left to their own devices to find a suitable telecommunications service provider that provides service to the geographic region that they traveled to.

Even if there are partnering telecommunications carriers within the geographic region to which the user traveled, partnering telecommunications carriers may not be equipped to handle new, unanticipated devices. For example, cellular network sites (e.g., cellular network towers, cellular network antennas, etc.) are strategically designed around cellular connectivity needs, such as a capacity of devices that can connect or otherwise communicate with the cellular network site. When new devices connect to the cellular network site that are not factored into the design, cellular network traffic may increase, further causing an increase in cellular connectivity latency. Not only does this hinder the user experience of users whose cellular network carrier is the partnering cellular carrier but also may disconnect users from the cell site when capacity is reached.

In light of these and other problems with existing solutions and systems, there is a need for providing location-based telecommunications resources to users. Furthermore, there is a need to accurately determine whether a user is eligible to receive telecommunications resources based on a geographically related status of the user. Moreover, there is a need to provide a temporal-based access to telecommunications resources to efficiently provide telecommunications resources to verified users as opposed to unverified users.

The inventors have developed a system for providing location-based telecommunications resources to users. For example, the inventors have developed a unique telecommunications resource-providing system that (i) determines whether a user is to be located within a geographical area for a given time period using verifiable information and (ii) provides temporal-based access to one or more telecommunications resources for a determined time period. As such, the system can enable verified user access to telecommunications resources for a specified time period that is based on determined location(s) of a user that reduce the amount of telecommunications network traffic experienced by telecommunications resources, thereby reducing telecommunications connectivity latency.

The system can detect a presence of a mobile device of a user being in a geographical area serviced by a telecommunications service provider and determine whether the mobile device is registered with the telecommunications service provider. For example, the system may detect whether an unregistered device has entered a geographic area serviceable by the telecommunications service provider. As an unregistered device within a serviceable area is indicative that the user does not have telecommunications network coverage, the system is notified of devices in need of telecommunications resources. Upon determining that the mobile device is not registered with the telecommunications service provider, the system may provide a message to the mobile device indicating the availability of a temporal-based access to one or more telecommunications resources for a given time period and may receive a response from the mobile device accepting the access to the telecommunications resources. For example, the system may provide access to a cellular network for a short time period to enable a currently disconnected device to have access to the network.

As the mobile device is able to access the telecommunications resources, the system may determine whether the user is associated with a geographically-related status that indicates the user is located within the geographic area for another time period. For instance, the user of the mobile device may provide information to support their geographically-related status (e.g., proof of address, a student visa, immigration status, etc.) and how long they will be within the area to reduce the amount of network traffic experienced by the cell sites. The system then updates the time period to which the mobile device has access to the one or more telecommunications resources based on the amount of time associated with the geographically-related status of the user. In this way, the system may reduce the amount of network traffic and network latency experienced by cell sites by providing telecommunications resource connectivity to verified users who are within the geographical area.

In various implementations, the methods and systems described herein can provide location-based access to telecommunications resources to users. For example, the system can detect a presence of a mobile device of a user being in a geographical area serviced by a telecommunications service provider. Upon determining that the mobile device is not registered with the telecommunications service provider, the system can provide a message to the mobile device indicating availability of a temporal-based access to one or more telecommunications resources provided by the telecommunications service provider. In response to receiving a response from the mobile device indicating acceptance of the temporal-based access, the system can activate the temporal-based access to the one or more telecommunications resources for a first time period. The system can determine whether the user is associated with a geographically-related status, where the geographically-related status indicates that the user is located within the geographical area for a second time period. The system can update the first time period to a third time period using the second time period associated with the geographically-related status of the user.

In various implementations, the methods and systems described herein can provide location-based telecommunications resources to users. For example, the system can detect a presence of a mobile device of a user being in a geographical area serviced by a telecommunications service provider. Upon determining that the mobile device is not registered with the telecommunications service provider, the system can provide a message to the mobile device indicating availability of a temporal-based access to one or more telecommunications resources provided by the telecommunications service provider. In response to receiving a response from the mobile device comprising independently-verifiable information, the system can verify the independently-verifiable information. In response to verifying the independently-verifiable information, the system can determine whether the user is associated with a geographically-related status, where the geographically-related status indicates that the user is located within the geographical area for a first time period. The system can activate the temporal-based access to the one or more telecommunications resources for a second time period using the first time period.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples. Wireless Communications System FIG. 1 is a block diagram that illustrates a wireless telecommunications network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, a radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links 132 (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of the network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A terrestrial network is enabled through the base stations 102 or antenna 116. A 6G implementation of the network 100 can support terahertz (THz) communications. This can support wireless applications that demand ultrahigh quality of service (QOS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

5G Core Network Functions

Figure 2:
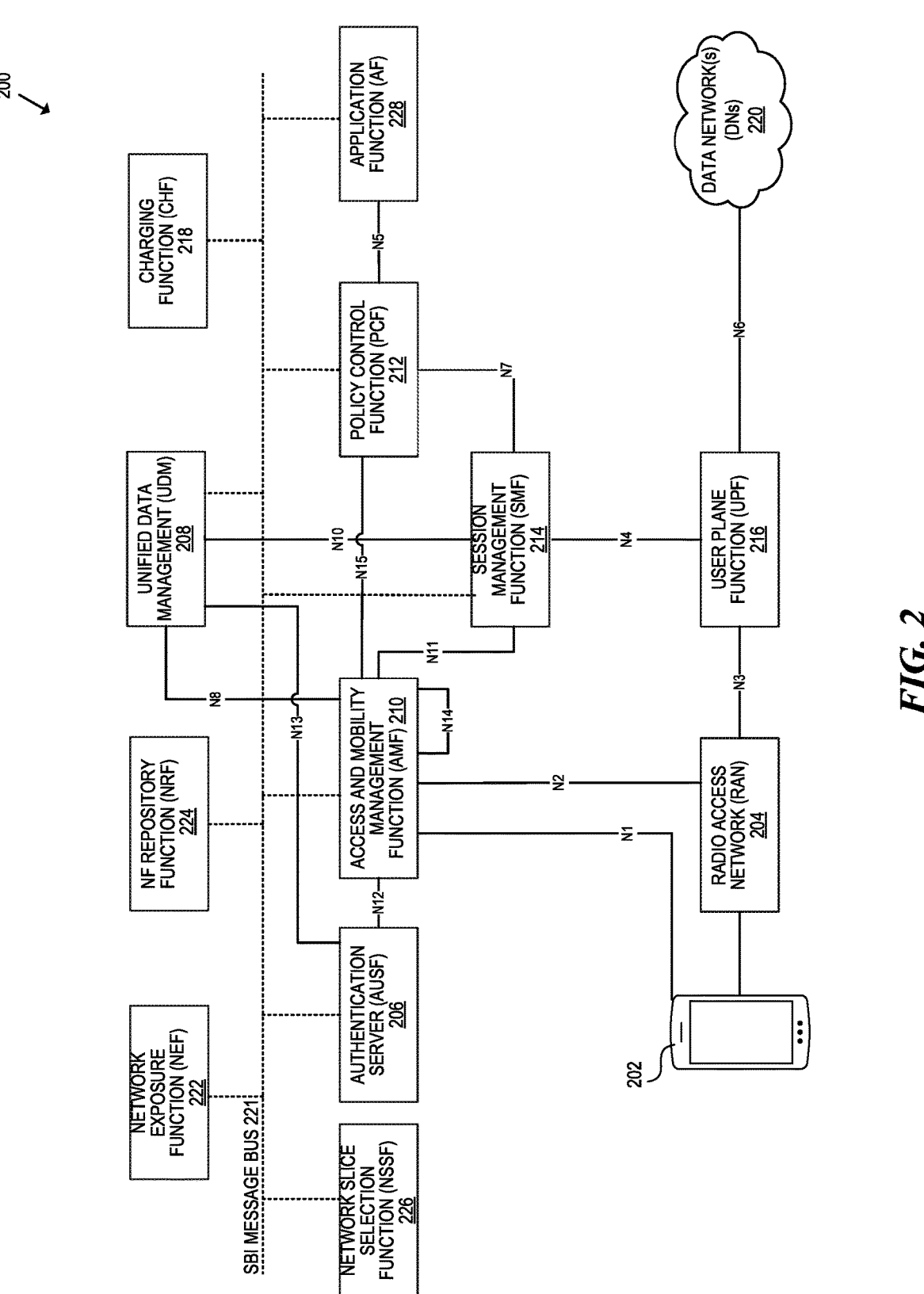
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has predetermined capabilities, traffic characteristics, and service-level agreements and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS) and can provide authentication credentials while being employed by the AMF 210 and SMF 214 to retrieve subscriber data and context.

The PCF 212 can connect with one or more Application Functions (AFs) 228.

The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of NFs once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

Providing Location-Based Telecommunications Resources

Figure 3:
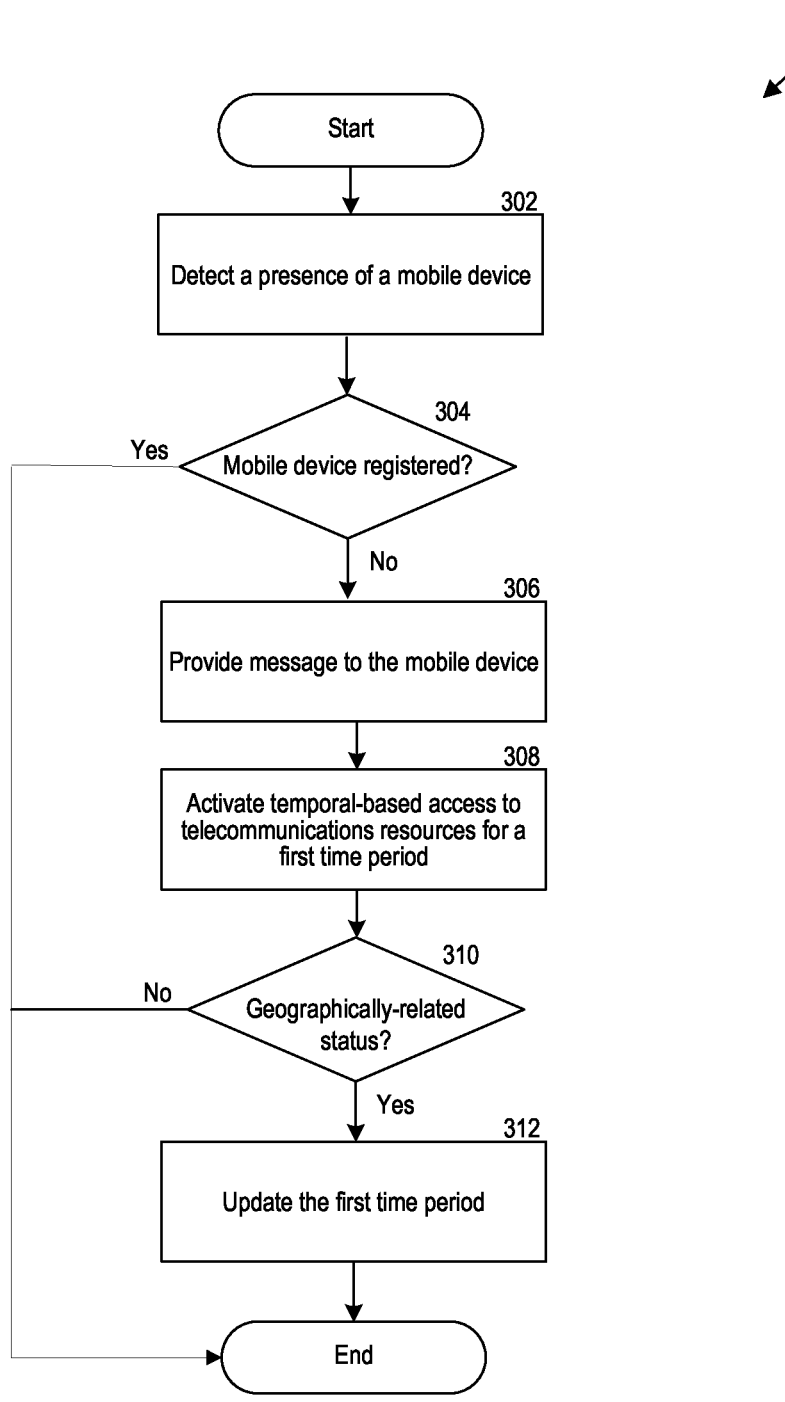
FIGS. 3-4 are flowcharts illustrating processes for providing location-based telecommunications resources to users, in accordance with one or more implementations of the present technology.

FIG. 3 is a flowchart illustrating a process for providing location-based telecommunications resources to users, in accordance with one or more implementations of the present technology.

At act 302, process 300 can detect a presence of a mobile device. For example, process 300 detects a presence of a mobile device of a user being in a geographical area serviced by a telecommunications service provider. To provide access to telecommunications resources, the system detects whether a mobile device of a user is within a service area of a telecommunications service provider. The telecommunications resources can be telecommunications network antenna (e.g., a cellular network antenna, a satellite for satellite communications), a telecommunications network site (e.g., a cell site, a satellite site), telecommunications service (e.g., cellular service, satellite service), telecommunications service plans or subscriptions (e.g., cellular or satellite service connectivity accounts), or other telecommunications network resources. The telecommunications service provider may be a telecommunications carrier, company, merchant, or other service provider that may provide telecommunications resources.

As a traveling user may not currently have access to telecommunications resources provided by a telecommunications service provider within the geographical area, to provide telecommunications resources to the mobile device of the user, the system detects whether the mobile device of the user is within the geographical area serviceable by the telecommunications service provider. In some implementations, the system can detect the presence of a mobile device of the user being within such geographical area based on SIM card information. For example, referring to FIG. 5, which illustrates communications between a computing device 502 (e.g., a mobile device, user device, etc.) and one or more communication components (e.g., network access nodes 504a-504b, network 506, servers 508a-508b, satellite 504c), as the mobile device of the user searches for a telecommunications network (e.g., cellular network, satellite network), the mobile device may attempt to connect to one or more cellular network sites (e.g., cell sites, cellular network antennas, satellites etc.). The mobile device of the user can extract an identifier from the SIM card, such as an IMSI value, and transmit the IMSI to a cell site (e.g., network access node 504b).

The cell site can receive the IMSI value and identify that the mobile device is within the geographical area (e.g., that is serviceable by the telecommunications service provider). For example, the cell site may provide the IMSI value to one or more telecommunications servers (e.g., servers 508a-508b) that are associated with the telecommunications service provider. In response to receiving the IMSI value, the system may detect the presence of the mobile device being within a serviceable range of the cell site (e.g., as the mobile device transmitted data to the cell site, the system can confirm that the mobile device is within range of the cell site).

In some implementations, the system can detect the presence of a mobile device of a user being in a geographical area serviced by a telecommunications service provider via a relayed message. For instance, where the mobile device of the user does not have a SIM card currently installed on their mobile device (or where a SIM card is not functioning properly), the system can nonetheless detect a presence of a mobile device being within a geographical area serviced by the telecommunications service provider. For example, the system can receive a message from the mobile device indicating a mobile device identifier and a communication channel identifier. The mobile device identifier can be an international mobile equipment identity (IMEI) number, a serial number of the mobile device, a mobile device name, or other identifier that is unique to the mobile device. The communication channel identifier can be an IP address, a Media Access Control (MAC) address, Bluetooth MAC address, or other identifier related to the communication channel and the mobile device.

The system then determines the geographical area associated with the communication channel using the communication channel identifier. For example, where the mobile device is communicatively connected to a Wi-Fi network associated with the telecommunications service provider (e.g., at an airport, at the user's home, at a merchant location, etc.), the system determines the geographical area associated with the communication channel. For instance, the communication channel identifier can indicate location information of where the message from the mobile device originated. When the mobile device of the user (e.g., computing device 502) transmits the message to a Wi-Fi router (e.g., network access node 504a), the telecommunications service provider can receive the message at one or more servers associated with the telecommunications service provider (e.g., servers 508a-508b). Where the communication channel identifier is an IP address, the IP address can indicate the city, state, zip code, area code (e.g., of an Internet Service Provider (ISP)), or ISP identifier. The system can extract location information from the communication channel identifier and determine the geographical area or location from which the message was transmitted, thereby determining (i) where the user of the mobile device is located and (ii) the geographical area associated with the communication channel. For example, the system may provide an IP address to an IP geolocation service platform (e.g., a third-party entity) to determine a location associated with the IP address.

The system can then identify whether the telecommunications service provider (i) services the mobile device using the mobile device identifier and (ii) provides telecommunications resources within a geographical range of the determined geographical area (e.g., the location at which the user/mobile device of the user is located). For example, as mobile devices (or other computing devices) may be locked to a specific telecommunications service provider (or carrier), the system can determine whether the telecommunications service provider is able to provide network resources (e.g., cellular connectivity, a cellular subscription plan, satellite communications, a satellite subscription plan, etc.) to the mobile device using the mobile device identifier. The system can store a register of serviceable devices in one or more databases that indicate device identifiers that are configured to receive network resources from the telecommunications service provider. The system can query the database to identify whether the mobile device is able to be serviced by the telecommunications service provider based on a match between one or more stored device identifiers (e.g., in the databases) and the mobile device identifier of the mobile device.

Upon identifying whether the telecommunications service provider services the mobile device, the system can identify whether the telecommunications service provider provides telecommunications resources within a geographic range of the geographic area. For example, to provide telecommunications resources to the mobile device, the system not only verifies whether the mobile device can be serviced but also whether the telecommunications service provider is able to provide telecommunications resources to the mobile device within the geographical range of the location of the mobile device. As such, the system may determine, based on the location information received by the mobile device, whether the telecommunications service provider provides telecommunications resources within a geographical range of the mobile device's location. The geographical range may be a threshold value, such as 1 foot, 2 feet, 1 meter, 2 meters, 100 feet, 200 feet, 100 meters, 200 meters, 1 mile, 2 miles, 1 kilometer, 2 kilometers, or other metric.

The system can determine, based on locations of cell sites (or satellite communication sites) associated with the telecommunications service provider, whether the mobile device of the user is within the geographical range of one or more cell sites that is associated with the telecommunications service provider. For example, where the mobile device's location information indicates a city, the system can determine whether one or more cell sites are located in that city (e.g., by querying one or more databases indicating the locations of cell sites associated with the telecommunications service provider). The system then may compare the location of an identifier cell site within the city to the location information of the mobile device. Based on the comparison indicating that the location information of the mobile device is within the geographical range of the geographical area (e.g., of the cell site), then the system identifies that the telecommunications service provider provides telecommunications resources within the geographical range of the location of the mobile device. Where the telecommunications service provider services the mobile device and provides telecommunications resources within the geographical range of the geographical area to which the mobile device is located, the system may determine that the mobile device of the user is within a geographical area serviced by the telecommunications service provider. In this way, the system may verify that the mobile device is able to receive telecommunications resources provided by the telecommunications service provider.

At act 304, process 300 can determine whether the mobile device is registered. For example, process 300 determines whether the mobile device is registered with the telecommunications service provider. When providing telecommunications resources to travelers, such as visa students, immigrants, or other users who are in a given geographic region, the system determines whether the user already has access (or does not have access) to telecommunications resources of the telecommunications service provider. For example, as unregistered users are in need of telecommunications resources to perform day-to-day activities to ensure their success when traveling (e.g., access to financial resources, access to educational resources, access to transportation resources), the system may determine whether they have or do not have access to telecommunications resources. Where users already have access to telecommunications resources (e.g., via their mobile device) of the telecommunications service provider, the process 300 may end to avoid unnecessary processing of data by the system, thereby causing a reduction in wasted computer processing and memory resources. However, where the mobile device is not registered with the telecommunications service provider, the system may verify whether the user is eligible to obtain telecommunications resources through the telecommunications service provider.

In some implementations, the system can determine that the mobile device is not registered with the telecommunications service provider based on a registration database. For example, the system receives a message from the mobile device indicating a mobile device identifier. As discussed above, the mobile device identifier may be an IMEI number, a serial number of the mobile device, a mobile device name, or other identifier that is unique to the mobile device. The system uses the mobile device identifier of the mobile device to determine whether the mobile device is registered with the telecommunications service provider by accessing a registration database. For example, the registration database may indicate a mapping between registered mobile device identifiers and registration statues. The registration status may indicate whether the mobile device identifier is registered with the telecommunications service provider (e.g., "yes," "no," "registered," "unregistered," "0," "1," etc.). The system accesses the registration database to determine whether the mobile device identifier (e.g., of the user's mobile deice) corresponds to a registered mobile device identifier (e.g., of the registration database) having a registered registration status. For example, the system may query the registration database to determine a match between the mobile device identifier of the user and a mobile device identifier of the registration database. Upon determining the match, the system may determine whether the mobile device identifier is mapped to a registration status indicating that the mobile device is registered or not with the telecommunications service provider. However, in response to the mobile device identifier failing to correspond to any of the registered mobile device identifiers having the registered registration status, the system determines that the mobile device is not registered with the telecommunications service provider. As such, where the mobile device identifier fails to correspond to any of the registered mobile device identifiers (e.g., stored in the registration database), process 300 may proceed to act 306. In this way, the system reduces the amount of computer processing and computer memory resources that would otherwise be wasted on determining whether currently registered users are eligible to receive telecommunications resources.

At act 306, process 300 can provide a message to the mobile device. For example, process 300 provides a message to the mobile device indicating availability of a temporal-based access to one or more telecommunications resources provided by the telecommunications service provider. As discussed above, cell sites (and satellite sites) are designed around the available frequencies, a number of devices able to connect to the cell site, and other factors. When unintended or unconsidered devices connect to the cell site (e.g., cell tower), the cell site may experience a large amount of network traffic and may even disable access to one or more devices connected to the cell site. To reduce the amount of network traffic experienced by the telecommunications service provider (or the telecommunications resources such as cell sites or satellite sites of the telecommunications service provider, etc.) while ensuring that the user experience of registered users is not impacted (e.g., due to increased latency), the system can limit access to unregistered users attempting to obtain telecommunications resources.

As such, the system can provide a message indicating a temporal-based access to the telecommunications resources. For example, the message can be a text message, an email, a push notification, or other message that indicates that telecommunications resources are available for a given time period (e.g., one day, one week, one month, one year, etc.). For instance, the temporal-based access to the telecommunications resources may be for a period of time that the user may have access to the telecommunications resources (e.g., a one-week free trial, one-week reduced fee trial, indefinitely available, etc.). The one or more servers associated with the telecommunications resources (e.g., servers 508a-508b) may generate the message and provide the message to the mobile device (e.g., computing device 502) via one or more communications components (e.g., network access nodes 504a-504b). Not only does this enable unregistered users access to the telecommunications resources of the telecommunications service provider but also mitigates any adverse effects experienced by currently registered users of the telecommunications service provider by limiting the amount of time to which currently unregistered users are able to access telecommunications resources. In some implementations, the message may be interactive such that a user can accept the temporal-based access (e.g., via a hyperlink, a button, or other interactive element embedded in the message).

At act 308, process 300 can activate temporal-based access to telecommunications resources for a first time period. For example, in response to receiving a response from the mobile device indicating acceptance of the temporal-based access, the system may activate the temporal-based access to the one or more telecommunications resources for a first time period. The first time period may be the time period indicated in the temporal-based access message of act 306. Activating the temporal-based access may be effectuated by activating a secure module embedded into the mobile device of the user. The secure module may be an embedded-SIM (eSIM), a hardware security module (HSM), or other module configured for storing SIM-related information (e.g., ICCID, IMSI, PIN, PUK, serial SIM number (SSN), PIN2, PUK2, EAN, contacts, text messages, phone numbers, user identifiers, security keys, location information, etc.).

Figure 5:
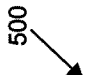
FIG. 5 is a block diagram that illustrates communications between a computing device and one or more communication components, in accordance with one or more implementations of the present technology.

For example, referring to FIG. 5, the system may receive a response from the mobile device (e.g., computing device 502), via network access node 504a or network access node 504b, which may be relayed to network 506 and received by server 508a or server 508b. In response to receiving the response from the mobile device, the system may generate and provide an activation message (e.g., via network access nodes 504a-504b) to the mobile device to enable access to the telecommunications resources for the first time period. The activation message may include SIM-related information for use in activating the security module that is part of the mobile device of the user. Additionally, the system may update one or more database entries (e.g., the registration database) to reflect the registration status of the mobile device as a registered mobile device corresponding to the mobile device identifier of the mobile device. For example, registration database may also store SIM-related information corresponding to each mobile device that is registered or activate for access to telecommunications resources of the telecommunications service provider. Additionally, the registration database can also store time-period-related information indicating time periods for which access to the telecommunications resources are available.

For example, in the context of providing a one-week free trial to a user, the system can provide a push notification to the mobile device of the user indicating a one-week free trial is available. The user may interact with an interactive portion of the push notification to accept the one-week free trial. Upon interacting with the interactive portion of the push notification, the system can activate the one-week free trial by pushing SIM-related information to the mobile device of the user to activate an eSIM that is part of the mobile device of the user. In this way, unregistered and unconnected users may gain access to telecommunications resources for a predetermined time period, thereby reducing undue or unconsidered network traffic for extended periods of time.

Referring back to FIG. 3, at act 310, process 300 can determine a geographically-related status. For example, process 300 determines whether the user is associated with a geographically-related status indicating that the user is located within the geographical area for a second time period. Where the user is associated with a geographically-related status, process 300 may proceed to act 312. Where the user is not associated with a geographically-related status, process 300 may end. For instance, to ensure that eligible travelers (e.g., international students, visa students, immigrants, other long term travelers, etc.) are enabled access to telecommunications resources via the telecommunications service provider without causing an undue increase in network traffic of telecommunications resources from ineligible travelers, the system determines a second time period to which the user is within the geographical area (e.g., that is serviceable by the telecommunications service provider).

As an example, the geographically-related status may be associated with a visa, a visa type, a citizenship status, an address (e.g., street, city, zip code, country, etc.), or other personal information associated with a user. For example, in the context of travelers, such as international students, there exists a need to connect to various financial, societal, and transportation resources upon traveling to a geographic location that is foreign to the student. Telecommunications service providers may provide access for a given time period to one or more telecommunications resources to enable travelers to connect with the aforementioned resources. However, to limit the amount of network traffic experienced by the telecommunications resources and improve the user experience of users who are accessing such telecommunications resources, the system may provide access to the telecommunications resources to users who are associated with a verified (e.g., a determined or eligible) geographically-related status.

In some implementations, the system can determine whether one or more documents are verified. For example, the system can receive an image of a document associated with the geographically-related status of the user. The document may be a visa, a driver's license, proof of address, a citizenship card, a transcript, a court document, a passport, or other document that may be associated with the user configured to provide a geographically-related status. In response to receiving the document, the system can provide the document to a third-party verification service configured to process a document type associated with the document. For instance, the system may determine the document type by performing NLP, OCR, or other image-based recognition techniques on the document. For instance, the document type may refer to a characteristic or form of the document, such as being a visa, a driver's license, a transcript, or other document type. The system can then provide the document to a third-party verification service that may verify the authenticity of the document. The third-party verification service may be any verification platform that may verify the correctness or authenticity of a document, such as ID.me, Systematic Alien Verification for Entitlements (SAVE), SheerID, Lightico, LastPass, Rippling, E-Verify, or other verification platforms or services. The third-party verification service can provide a response to the system indicating that the document is authentic, verified, true, or correct. The system may receive such response, and in response to receiving the response can determine that the document is a verified document. In this way, the system may verify the eligibility of users to whom to provide one or more telecommunications resources, thereby preventing undue network traffic experienced by telecommunications resources via ineligible users.

In some implementations, the system can determine the second time period (e.g., indicating that the user will be within the geographical area) based on a value associated with the document. For example, in response to the document being verified, the system can determine an expiration date associated with the document. For example, the system can perform OCR, NLP, or another image-based recognition technique to extract one or more values within the document that indicate an expiration date. For instance, where the document is a student visa, the system may extract an expiration date from the student visa. The system can determine the second time period using the expiration data associated with the document. For example, the system can determine the second time period using the expiration date by determining a difference between the current date (e.g., unix time, epoch time, etc.) and the expiration date. For instance, where the expiration date is Aug. 7, 2024 and the current date is Jan. 1, 2024, the second time period may be eight months and six days. In some implementations, the system can use the expiration date as the second time period (e.g., Aug. 7, 2024). In this way, the system determines how long a user is within the geographical area, thereby enabling the system to provide one or more telecommunications resources.

In some implementations, the system can deactivate the temporal-based access to the one or more telecommunications resources. To prevent ineligible users from accessing telecommunications resources available via the telecommunications service provider, the system can deactivate the temporal-based access to the one or more telecommunications resources, thereby reducing unnecessary network traffic stemming from ineligible users. For example, in response to the response from the third-party verification service indicating that the document is not authentic (e.g., untrue, unverified, etc.), the system determines that the document is an unverified document. In response to the document being unverified, the system deactivates the temporal-based access to the one or more telecommunications resources. For example, the system can deactivate the temporal-bases access by removing, deleting, or changing the registration status of the user in one or more registration databases. In this way, the system may reduce network traffic experienced by the telecommunications resources caused by ineligible users.

In some implementations, the system can determine whether a user is associated with a geographically-related status by determining whether the user is associated with another telecommunications service provider that is outside of a serviceable range of the other telecommunications service provider. For example, as telecommunications service providers may have a partnership with one or more other telecommunications service providers, it is advantageous to determine whether the telecommunications service provider to which the user is within a serviceable range has a partnership with another telecommunications service provider. For instance, the user may have telecommunications resource access (e.g., a subscription service plan) with another telecommunications service provider in the user's home country. The other telecommunications service provider may have a partnership agreement with the telecommunications service provider in the country to which the user has traveled such that the user may make phone calls, access the Internet, send text messages, or perform other actions.

Telecommunications service providers may store information pertaining to which telecommunications service providers they have a partnership with in one or more databases, which can map device identifiers to the partnered telecommunications service providers. As such, the system can query a database with a mobile device identifier of the mobile device to determine whether the mobile device is associated with another telecommunications service provider (e.g., a partnered telecommunications service provider). In response to the query returning an indication that the mobile device is associated with another telecommunications service provider, the system determines (i) a first geographic location associated with the telecommunications service provider and (ii) a second geographic location associated with the other telecommunications service provider. For instance, the first geographic location associated with the telecommunications service provider may be a geographic location in which the telecommunications service provider provides telecommunications resources (e.g., the geographic region to which the user has traveled that is serviceable by the telecommunications service provider), and the second geographic location associated with the other telecommunications service provider may be a geographic location in which the other telecommunications service provider provides telecommunications resources (e.g., the geographic region that is the user's home region that is serviceable by the other telecommunications service provider).

The system can determine whether the first geographic location is within a threshold distance of the second geographic location. For example, to verify whether the user has traveled to another geographic region where telecommunications resources available via their home telecommunications service provider may be unavailable, the system can determine whether the first geographic location is within a threshold distance of the second geographic location. The threshold distance may be a predetermined distance, such as 100 feet, 1,000 feet, 100 meters, 10,000 meters, 1 mile, 1,000 miles, 1 kilometer, 1,000 kilometers, or other predetermined distance. In response to the first geographic location failing to be within a threshold distance of the second geographic location, the system can determine that the user is associated with the geographically-related status. As such, the system can verify whether users have traveled to a given geographic region where their home telecommunications service provider does not provide telecommunications resources, thereby reducing the amount of network traffic caused by unverified users.

At act 312, process 300 can update the first time period. For example, process 300 updates the first time period to a third time period using the second time period associated with the geographically-related status of the user. To provide eligible users with access to telecommunications resources available via the telecommunications service provider for an extended period of time, the system may update the first time period to another time period based on how long the user is within the geographic region. For instance, where the first time period is a temporary access time period (e.g., one day, two days, etc.), the system may update the first time period to a third time period (e.g., one week, two, weeks, one month, one year, etc.) based on the second time period (e.g., indicating that the user is located within the geographical area for a given period of time).

In one use case, where a visa student is originally granted access to the telecommunications resources (e.g., as described in act 308), the system may determine that the student is or will be located within the geographical area for one year. As such, the system may update the first time period (e.g., indicating a duration of access time to the telecommunications resources) based on the student being within the geographical area for one year. For instance, the first time period can be updated to one month, two months, one year, or other time period to enable the user to access one or more financial, economical, societal, or transportation resources. In some implementations, the system may update the first time period such that the first time period does not exceed the second time period. For example, to reduce the amount of network traffic experienced by the telecommunications resources, the system may limit the amount of time to which a user has access to the telecommunications resources. For example, the system can determine an expiration date of a student's visa and may update the first time period to a time at or before the expiration date. In other implementations, the system can update the first time period to a predetermined time period irrespective of the second time period (e.g., to which the user is or will be within the geographical area). For instance, the system may update the first time period to one month for all users who are deemed eligible for access to the telecommunications resources (e.g., as described in act 310).

In some implementations, the system may automatically deactivate the temporal-based access. For example, where the temporal-based access is associated with an expiration date or time, the system may automatically deactivate the temporal-based access upon the expiration date. For instance, where the temporal-based access is for a time period of one week from the current date, and the current date is Aug. 8, 2023, the system may deactivate the temporal-based access to the one or more telecommunications resources on Aug. 15, 2023. In this way, the system reduces network traffic experienced by the telecommunications resources caused by ineligible users.

Figure 4:
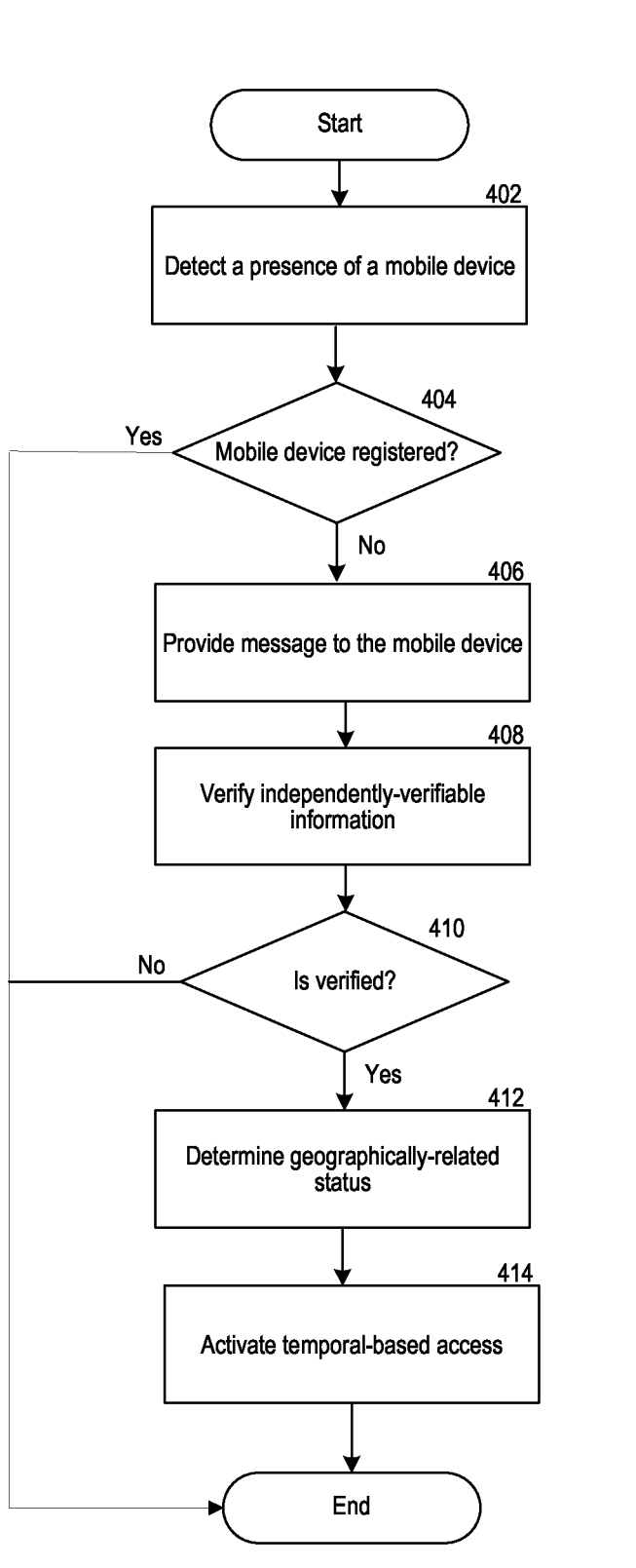

FIG. 4 is another flowchart illustrating a process for providing location-based telecommunications resources to users, in accordance with one or more implementations of the present technology.

At act 402, process 400 can detect a presence of a mobile device. For example, process 400 detects a presence of a mobile device of a user being in a geographical area serviced by a telecommunications service provider. In some implementations, the system detects a presence of the mobile device of a user being in a geographical area serviced by the telecommunications service provider in a manner that is the same as or similar to that described in act 302 (FIG. 3).

At act 404, process 400 can determine whether the mobile device is registered. For example, process 400 determines whether the mobile device is registered with the telecommunications service provider. In some implementations, the system determines whether the mobile device is registered with the telecommunications service provider in a manner that is the same as or similar to that described in act 304 (FIG. 3). Where the mobile device is registered, process 400 may end. Where the mobile device is not registered, process 400 may proceed to act 406.

At act 406, process 400 can provide a message to the mobile device. For example, process 400 provides a message to the mobile device indicating availability of a temporal-based access to one or more telecommunications resources provided by the telecommunications service provider. In some implementations, the system provides a message to the mobile device indicating availability of the temporal-based access to one or more telecommunications resources provided by the telecommunications service provider in a manner that is the same as or similar to act 306 (FIG. 3).

At act 408, process 400 can verify independently-verifiable information. For example, in response to receiving a response from the mobile device comprising independently-verifiable information, process 400 can verify the independently verifiable information. To reduce the amount of computer processing and memory resources utilized when providing telecommunications resources to users, the system may verify independently verifiable information prior to activating temporal-based access to telecommunications resources. For instance, where an ineligible user attempts to abuse the system (e.g., gaining temporal-based access to telecommunications resources), the system may first verify that the user is eligible or verified to receive temporal-based access to telecommunications resources prior to activating temporal-based access to telecommunications resources as described in act 308 (FIG. 3).

For example, where the mobile device transmits a response to the message indicating independently-verifiable information, such as one or more documents associated with a geographically-related status of the user, the system may provide the document to one or more third-party verification services configured to verify the authenticity of the document. The independently-verifiable information can be a visa, a driver's license, proof of address, a citizenship card, a transcript, a court document, a passport, or other document that may be associated with the user configured to provide a geographically-related status. In some implementations, verifying the independently-verifiable information may be performed in a manner that is the same as or similar to that as verifying the documents as described in act 310 (FIG. 3). Where the independently-verifiable information is verified at act 410 (e.g., authentic, true, verified, etc.), process 400 may proceed to act 412. Where the independently-verifiable information is not verified at 410 (e.g., unauthentic, untrue, unverified, etc.), process 400 may end.

At act 412, process 400 can determine a geographically-related status. For example, in response to verifying the independently-verifiable information, process 400 determines whether the user is associated with a geographically-related status. The geographically-related status can indicate that the user is located within the geographical area for a given time period. For example, the system may use the independently-verifiable information to determine whether the user is associated with a geographically-related status. In some implementations, determining whether the user is associated with a geographically-related status may be performed in a manner that is the same as or similar to that as described in act 310 (FIG. 3). For example, although the independently-verifiable information has been verified, the system may determine the geographically-related status of the user and the time period related to how long the user will be in the geographic region (e.g., via the expiration dates) to determine a time period indicating a duration of temporal-based access of telecommunications resources.

At act 414, process 400 can activate temporal-based access. For example, process 400 activates the temporal-based access to the one or more telecommunications resources for another time period using the time period related to how long the user will be in the geographic region. For instance, to reduce the amount of network traffic experienced by telecommunications resources provided by the telecommunications service provider, the system can activate temporal-based access to the telecommunications resources after verifying independently-verifiable information and determining that the user is associated with a geographically-related status. In this way, users may not gain access to the telecommunications resources until they are verified as eligible to do so.

Process 400 can activate the temporal-based access to the one or more telecommunications resources for a time period based on how long the user will be located within the geographic region. For example, the system may use an expiration date of a document that is related to the geographically-related status of the user to enable access to the telecommunications resources until the expiration date is met. In this way, the system may reduce the amount of computer processing and computer memory resources by forgoing an update to a time period associated with the temporal-based access and instead providing access to the telecommunications resources based on how long the user will be located within the geographic region. In some implementations, activating the temporal-based access to the one or more telecommunications resources may be performed in a manner that is the same as or similar to that as described in act 308 (FIG. 3).

Computer System

Figure 6:
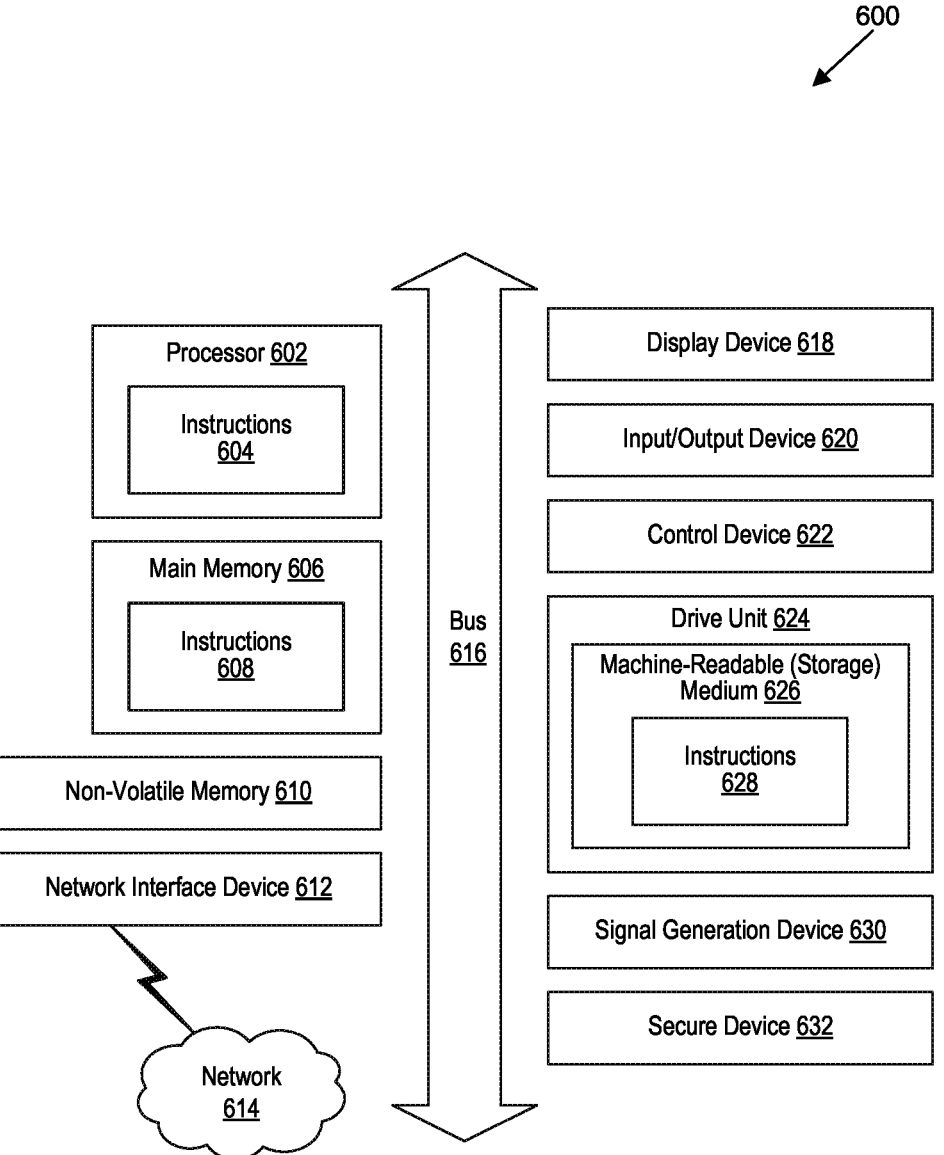
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, a video display device 618, an input/output device 620, a control device 622 (e.g., keyboard and pointing device), a drive unit 624 that includes a machine-readable (storage) medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computer system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 600. In some implementations, the computer system 600 can be an embedded computer system, a system-on-chip (SOC), a single-board computer system (SBC), or a distributed system such as a mesh of computer systems, or it can include one or more cloud components in one or more networks. Where appropriate, one or more computer systems 600 can perform operations in real time, in near real time, or in batch mode.

The network interface device 612 enables the computer system 600 to mediate data in a network 614 with an entity that is external to the computer system 600 through any communication protocol supported by the computer system 600 and the external entity. Examples of the network interface device 612 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable medium 626 can include any medium that is capable of storing, encoding, or carrying a set of instructions for execution by the computer system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computer system 600 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A method for providing location-based telecommunications resources to users, the method comprising:
   detecting a presence of a mobile device of a user being in a geographical area serviced by a telecommunications service provider;
   upon determining that the mobile device is not registered with the telecommunications service provider:
      providing a message to the mobile device indicating availability of a temporal-based access to one or more telecommunications resources provided by the telecommunications service provider;
      in response to receiving a response from the mobile device indicating acceptance of the temporal-based access, activating the temporal-based access to the one or more telecommunications resources for a first time period;
      determining whether the user is associated with a geographically-related status, wherein the geographically-related status indicates that the user is located within the geographical area for a second time period; and
      updating the first time period to a third time period using the second time period associated with the geographically-related status of the user.

2. The method of claim 1, wherein detecting the presence of the mobile device further comprises:
   receiving a second message from the mobile device indicating a mobile device identifier and a communication channel identifier;
   determining the geographical area associated with the communication channel using the communication channel identifier; and
   identifying whether the telecommunications service provider (i) services the mobile device using the mobile device identifier and (ii) provides the one or more telecommunications resources within a geographical range of the determined geographical area.

3. The method of claim 1, wherein determining that the mobile device is not registered with the telecommunications service provider further comprises:
   receiving a second message from the mobile device indicating a mobile device identifier;
   accessing a registration database indicating a mapping between registered mobile device identifiers and registration statuses to determine whether the mobile device identifier corresponds to a registered mobile device identifier having a registered registration status; and
   in response to the mobile device identifier failing to correspond to the registered mobile device identifier having the registered registration status, determining that the mobile device is not registered with the telecommunications service provider, wherein the mobile device identifier fails to correspond to any of the registered mobile device identifiers having a registered registration status.

4. The method of claim 1, wherein the geographically-related status is associated with at least one of a visa, a visa type, citizenship status, an address, or personal information associated with the user.

5. The method of claim 1, further comprising:
receiving an image of a document associated with the geographically-related status of the user;
in response to receiving the document, providing the document to a third-party verification service configured to process a document type associated with the document;
receiving a response from the third-party verification service related to an authenticity of the document; and
in response to the response from the third-party verification service indicating that the document is authentic, determining that the document is a verified document.

6. The method of claim 5, further comprising:
in response to the document being verified, determining an expiration date associated with the document; and
determining the second time period using the expiration date associated with the document.

7. The method of claim 5, further comprising:
in response to the response from the third-party verification service indicating that the document is not authentic, determining that the document is an unverified document; and
in response to the document being unverified, deactivating the temporal-based access to the one or more telecommunications resources.

8. The method of claim 1, further comprising:
querying a database with a mobile device identifier of the mobile device, wherein the database comprises information mapping device identifiers to second telecommunications service providers;
in response to the query returning an indication that the mobile device is associated with a different telecommunications service provider, determining (i) a first geographic location associated with the telecommunications service provider and (ii) a second geographic location associated with the different telecommunications service provider; and
in response to the first geographic location failing to be within a threshold distance of the second geographic location, determining that the user is associated with the geographically-related status.

9. A system comprising:
at least one hardware processor; and
at least one non-transitory memory storing instructions, which, when executed by the at least one hardware processor, cause the system to:
detect a presence of a mobile device of a user being in a geographical area serviced by a telecommunications service provider;
upon determining that the mobile device is not registered with the telecommunications service provider:
provide a message to the mobile device indicating availability of a temporal-based access to one or more telecommunications resources provided by the telecommunications service provider;
in response to receiving a response from the mobile device indicating acceptance of the temporal-based access, activate the temporal-based access to the one or more telecommunications resources for a first time period;

determine whether the user is associated with a geographically-related status, wherein the geographically-related status indicates that the user is located within the geographical area for a second time period; and
update the first time period to a third time period using the second time period associated with the geographically-related status of the user.

10. The system of claim 9, wherein detecting the presence of the mobile device further comprises:
receiving a second message from the mobile device indicating a mobile device identifier and a communication channel identifier;
determining the geographical area associated with the communication channel using the communication channel identifier; and
identifying whether the telecommunications service provider (i) services the mobile device using the mobile device identifier and (ii) provides the one or more telecommunications resources within a geographical range of the determined geographical area.

11. The system of claim 9, wherein determining that the mobile device is not registered with the telecommunications service provider further comprises:
receiving a second message from the mobile device indicating a mobile device identifier;
accessing a registration database indicating a mapping between registered mobile device identifiers and registration statuses to determine whether the mobile device identifier corresponds to a registered mobile device identifier having a registered registration status; and
in response to the mobile device identifier failing to correspond to the registered mobile device identifier having the registered registration status, determining that the mobile device is not registered with the telecommunications service provider, wherein the mobile device identifier fails to correspond to any of the registered mobile device identifiers having a registered registration status.

12. The system of claim 9, wherein the geographically-related status is associated with at least one of a visa, a visa type, citizenship status, an address, or personal information associated with the user.

13. The system of claim 9, wherein the instructions, which, when executed by the at least one hardware processor, further cause the system to:
receive an image of a document associated with the geographically-related status of the user;
in response to receiving the document, provide the document to a third-party verification service configured to process a document type associated with the document;
receive a response from the third-party verification service related to an authenticity of the document; and
in response to the response from the third-party verification service indicating that the document is authentic, determine that the document is a verified document.

14. The system of claim 13, wherein the instructions, which, when executed by the at least one hardware processor, further cause the system to:
in response to the document being verified, determine an expiration date associated with the document; and
determine the second time period using the expiration date associated with the document.

15. The system of claim 13, wherein the instructions, which, when executed by the at least one hardware processor, further cause the system to:

in response to the response from the third-party verification service indicating that the document is not authentic, determine that the document is an unverified document; and in response to the document being unverified, deactivate the temporal-based access to the one or more telecommunications resources.

16. The system of claim 9, wherein the instructions, which, when executed by the at least one hardware processor, further cause the system to:

query a database with a mobile device identifier of the mobile device, wherein the database comprises information mapping device identifiers to second telecommunications service providers;

in response to the query returning an indication that the mobile device is associated with a different telecommunications service provider, determine (i) a first geographic location associated with the telecommunications service provider and (ii) a second geographic location associated with the different telecommunications service provider; and in response to the first geographic location failing to be within a threshold distance of the second geographic location, determine that the user is associated with the geographically-related status.

17. One or more non-transitory, computer-readable storage media comprising instructions recorded thereon, wherein the instructions when executed by at least one data processor of a system, cause the system to:

detect a presence of a mobile device of a user being in a geographical area serviced by a telecommunications service provider;

upon determining that the mobile device is not registered with the telecommunications service provider:

provide a message to the mobile device indicating availability of a temporal-based access to one or more telecommunications resources provided by the telecommunications service provider;

in response to receiving a response from the mobile device indicating acceptance of the temporal-based access, activate the temporal-based access to the one or more telecommunications resources for a first time period;

determine whether the user is associated with a geographically-related status, wherein the geographically-related status indicates that the user is located within the geographical area for a second time period; and update the first time period to a third time period using the second time period associated with the geographically-related status of the user.

18. The one or more non-transitory, computer-readable storage media of claim 17, wherein detecting the presence of the mobile device further comprises:

receiving a second message from the mobile device indicating a mobile device identifier and a communication channel identifier;

determining the geographical area associated with the communication channel using the communication channel identifier; and identifying whether the telecommunications service provider (i) services the mobile device using the mobile device identifier and (ii) provides the one or more telecommunications resources within a geographical range of the determined geographical area.

19. The one or more non-transitory, computer-readable storage media of claim 17, wherein determining that the mobile device is not registered with the telecommunications service provider further comprises:

receiving a second message from the mobile device indicating a mobile device identifier;

accessing a registration database indicating a mapping between registered mobile device identifiers and registration statuses to determine whether the mobile device identifier corresponds to a registered mobile device identifier having a registered registration status; and in response to the mobile device identifier failing to correspond to the registered mobile device identifier having the registered registration status, determining that the mobile device is not registered with the telecommunications service provider, wherein the mobile device identifier fails to correspond to any of the registered mobile device identifiers having a registered registration status.

20. The one or more non-transitory, computer-readable storage media of claim 17, wherein the geographically-related status is associated with at least one of a visa, a visa type, citizenship status, an address, or personal information associated with the user.

* * * * *